United States Patent Office 3,788,853
Patented Jan. 29, 1974

3,788,853
PHOTOGRAPHIC ELEMENTS COMPRISING COMPLEXES OF TITANIUM DIOXIDE AND AN ORGANIC LIGAND
Paul B. Gilman, Jr., and John A. Haefner, Rochester, N.Y., assignors to Eastman Kodak Company, Rochester, N.Y.
No Drawing. Continuation of abandoned application Ser. No. 711,869, Mar. 11, 1968. This appplication Apr. 19, 1971, Ser. No. 135,394
Int. Cl. G03c 1/76
U.S. Cl. 96—69                                10 Claims

ABSTRACT OF THE DISCLOSURE

Photographic elements incorporating a light-sensitive colored complex of titanium dioxide and an unsaturated organic ligand compound containing at least one polydentate chelating group, such as 8-hydroxy quinoline compounds, aromatic vicinal polyol compounds and the like unsaturated organic compounds having at least two closely positioned electron-donating atoms, can exhibit a sensitivity to visible light radiation which is of an efficiency equipment to the ultraviolet light sensitivity of unsensitized titanium dioxide. Aromatic vicinal polyols are preferred. Such sensitization occurs both with binderless, vacuum-deposited titanium dioxide and with particulate titanium dioxide which is dispersed in a binder material.

---

This is a continuing application of Ser. No. 711,869, filed Mar. 11, 1968, now abandoned.

This invention relates to photography, and more particularly, to photographic elements incorporating photosensitive titanium dioxide which is spectrally sensitized to visible light and to photographic processes involving such elements.

It is known in the art to employ titanium dioxide, coated from a binder material, as the photoactive component in a light-sensitive photographic element. Such elements are imagewise exposed and processed by physical development techniques to produce conventional photographic images. Additionally, it is known to sensitize titanium dioxide photographic elements to visible light by the addition of common spectral sensitizers, for example, cyanine dyes as described generally in French Pat. 1,437,765, since titanium dioxide itself is photosensitive only to radiation in the ultraviolet and near-ultraviolet portions of the spectrum.

Photographic elements incorporating a thin, unsensitized, binderless layer of vacuum-deposited titanium dioxide as the photosensitive component are described in Kennard and Haefner, U.S. Ser. No. 636,016, filed May 4, 1967, now U.S. Pat. 3,547,635, issued Dec. 15, 1970. This binder-free type of titanium dioxide photographic element is also imagewise exposed and physically developed by known techniques to provide photographic images.

Known spectral sensitizers used heretofore with titanium dioxide have not, however, produced a desirably high-speed sensitization to visible light. A continuing disadvantage associated with spectrally sensitized titanium dioxide is that the photosensitive efficiency obtained in the visible spectrum is not comparable to that degree of response obtained by unsensitized titanium dioxide in its region of absorption, essentially the ultraviolet portion of the spectrum.

Belgian Pat. 679,558 and its corresponding British Pat. 1,114,301, describe certain chelate-forming sensitizers for certain inorganic photoconductive materials, they bring the oxides, sulfides and selenides of zinc, cadmium, mercury, antimony, bismuth and lead. Titanium dioxide is not mentioned. As will be seen in Example 12 hereinbelow, sensitizers of the types described in the aforementioned patents do not efficiently sensitize titanium dioxide to light of the visible spectrum, a result that occurs, it is stated in British 1,114,301, when the photoconductor is one of the above-described materials other than titanium dioxide.

Accordingly, it is an object of this invention to provide new photosensitive layers of increased speed which incorporate spectrally sensitized titanium dioxide as the light-sensitive component.

It is another object of the present invention to provide novel photographic elements, incorporating spectrally sensitized titanium dioxide as the light-sensitive component, which exhibit improved photosensitivity to visible light.

Still another object of this invention is to provide new photographic elements, incorporating spectrally sensitized titanium dioxide dispersed in a binder material as the light-sensitive layer, which exhibit improved photosensitivity to visible light.

Yet another object of the instant invention is to provide new photographic elements incorporating a spectrally sensitized, binderless layer of titanium dioxide as the light-sensitive component, which exhibit improved photosensitivity to visible light.

Still an additional object of the present invention is to provide novel photographic processes.

Additional objects will become apparent from a consideration of the following specification and appended claims.

These and other objects of the present invention are accomplished with photographic elements comprising a support having coated thereon a light-sensitive layer comprising a colored complex of titanium dioxide and an unsaturated organic ligand compound having a polydentate chelating group.

Transition metals such as titanium form metal chelates. Titanium typically has a valence number of four, but possesses the capability of receiving two additional bonds from compounds bearing a chelating group or moiety, a functional grouping containing at least two atoms having unshared electrons and also intervening atoms that join the atoms having unshared electrons. Compounds which possess one or more chelating groups and are amenable to the formation of such chelate complexes are conventionally designated ligands or ligand compounds. Chelating groups having two atoms with unshared electrons are termed bidentate, with three such atoms the designation is tridentate etc., and the like for other polydentate chelating groups. The ligand compounds are designated in like fashion as bidentate, tridentate or other polydentate ligands.

The active component of a bidentate chelating group is a pair of electron-donating atoms that are conventionally those atoms, such as oxygen and nitrogen, which after being chemically bonded to another atom or atoms in a compound such as the ligands described herein, possess the capability of donating remaining unshared electrons to coordinate covalent bonds and thereby forming chelate rings with, for example, a titanium atom or ion. The electron donating atoms can be part of the nucleus or backbone of a ligand compound such as the nitrogen atom of a quinoline nucleus, or they can be attached thereto as substituents. When they are substituents, each can be either the entire substituent as a keto group oxygen atom, or directly attached to the nucleus as part of a larger grouping like the oxygen atom of a hydroxyl radical or the nitrogen atom of an amino group or an azo linkage. Alternatively, the electron-donating atoms can be attached to the nucleus or backbone via an intervening atom, as in the case of an oxygen atom joined to a lignand nucleus through the carbon atom of a carbonyl group.

These electron-donating atoms are, for optimum chelate ring stability, typically separated from each other on the ligand compound by either two or three intervening atoms. All of the interposed ligand atoms, including such atoms as the carbon atom of a carbonyl or carboxyl radical also containing an electron donating oxygen atom, are deemed interving atoms since they affect the size and therefore the stability of the ultimate chelate ring.

As noted herein, the subject invention is concerned with the spectral sensitization of titanium dioxide to visible light radiation by complexing it with various unsaturated ligand compounds bearing chelating moieties to form visible-light-sensitive, colored complexes. The mechanism whereby the colored complexes of this invention are formed is not completely understood, but it is speculated that titanium atoms at the outer surface of an octahedral titanium dioxide crystalline structure lack the coordinate saturation which is present for such atoms within the crystal, and the occurrence of coordinate unsaturation at the outer surface operates to render the titanium dioxide receptive to forming a new, complex photosensitive species with suitable ligands via the coordinate covalent bonding of chelate ring formation. More specifically, it is theorized that the coordinate unsaturated titanium atom of surface titanium dioxide molecules produces 5 or 6 membered, polydentate chelate ring complexes with ligand compounds bearing at least one bidentate chelating moiety such as those described herein.

It is to be emphasized that the instant invention comprehends the formation of a new photosensitive species. Titanium dioxide, sensitive to only actinic radiation, is complexed with such polydentate ligand compounds as are described herein to provide a colored photosensitive species which exhibits sensitivity to visible light radiation. It is unnecessary that a ligand exhibit color prior to complexing. In particular, certain colorless or slightly colored ligand compounds such as catechols, tannic acid and other polyhydroxylic gallate esters produce strongly colored titanium dioxide complexes of a hue different from that of the ligand.

Additionally, where initially colored ligands are complexed with titanium dioxide at a site in or near the chromophore, a pronounced shift in color and absorption spectra is obtained in the complex from that which was characteristic of the uncomplexed ligand; this effect decreases as the ligand's complexing site becomes more removed from the conjugated chain or nucleus which conventionally defines a chromophore.

Generally, ligands useful in the present invention are limited only by their potential to form a colored complex with titanium dioxide. The formation of such a complex renders titanium dioxide visible-light-sensitive to a degree which, at the spectra of maximum absorption, is substantially equivalent to the ultraviolet photoresponse of unsensitized titanium dioxide. In the formation of a stable complex between a transition metal ion or atom and a bidentate ligand, the cyclic nucleus containing both the metal component and the electron-donating and intervening atoms of the ligand's chelating group is for advantageous stability a five- or six-membered ring. Hence, a suitable ligand structure, as noted hereinabove, includes compounds wherein only two or three interposed atoms can separate the electron-donating atoms of the chelating groups noted herein.

More particularly, in the formation of the subject titanium dioxide complexes, advantageous bidentate and other polydentate ligands contain such electron-donating atoms as an oxygen atom and a nitrogen atom in a variety of structural relationships such as those mentioned hereinabove. Particularly suitable ligands are aromatic vicinal polyols including aryl vicinal polyols. Other desirable ligands include 8-hydroxyquinolines and aromatic compounds having a hydroxyl radical substituted ortho to a basic nitrogen atom. The remaining portion of the ligand can be a typical chromophore or another conjugated or other potential chromophoric configuration which becomes colored in the ultimate visible light absorbing complex.

Aromatic and aryl vicinal polyols which are particularly advantageous ligands in the practice of the subject invention include such 1,2-dihydroxy-substituted compounds as cyanine dyes, merocyanine dyes, anthraquinone dyes, dyes derived from benzylidene, styryl dyes, dyes derived from furan, phthalein dyes, oxonol dyes, dyes derived from cinnamylidene, pyrylium dyes, thiapyrylium dyes, selenpyrylium dyes, catechols and polyhydroxylic gallate esters. In each case of the noted classes of vicinal polyol compounds, at least two adjacent atoms in a cyclic nucleus, either aryl or aromatic, are substituted with a hydroxyl radical chelating moiety. The hydroxyl substitution is advantageously present directly on the dye chromophore or connected to it through a pattern of conjugated chemical bonds, such as a phenyl radical.

Organic vicinal polyols which are preferred ligands in forming the subject complexes include such compounds as are summarized immediately hereinbelow in tabular form.

TABLE I

| Compound class | Compound name |
| --- | --- |
| Cyanine dye | 3,3'-di(3,4-dihydroxy)-phenacylthiacarbocyanine chloride. |
| Do | 9-(3,4-dihydroxyphenyl)-3,3'-dimethylthiacarbocyanine iodine. |
| Do | 4-(3,4-dihydroxyphenyl)-3,3'-diethyloxathiazolocarbocyanine perchlorate. |
| Do | 3,3'-diethyl-11-(3,4-dihydrocyphenyl)-oxathiadicarbocyanine iodide. |
| Do | 3,3'-diethyl-9-(3,4-dihydroxyphenyl)-thiadicarbocyanine iodide. |
| Do | 1-(3,4-dihydroxybenzoyl)-5-(3-ethyl-5-phenyl-2-benzoxazolinylidene)-1,3-pentadienylpyridinium iodide. |
| Do | 1-(3,4-dihydroxybenzoyl)-5-(3-ethyl-2-benzothiazolinylidene)-,3-pentadienyl-pyridinium iodide. |
| Merocyanine dye | 2-(3-methyl-2-benzothiazolinylidene)-1-(3,4-dihydroxyphenyl)ethylidene malonitrile. |
| Do | 4-(3-ethyl-2-benzothiazolinylidene)-1-(3,4-dihydroxyphenyl)-2-butenylidene malonitrile. |
| Do | 2-(3-ethyl-2-(3)-benzoxazolylidene)-ethylidene-6,7-dihydroxy-3-(2)-benzofuranone. |
| Do | 2-[5-cyano-5-(3,4-dihydroxybenzoyl)-2,4-pentadienylidene]-3-ethyl-5-phenyl-benzoxazoline. |
| Do | 5-chloro-2-[5-cyano-5-(3,4-dihydroxybenzoyl)-2,4-pentadienylidene]-3-(3-sulfopropyl)-benzoxazoline. |
| Styryl dye | 2-(3,4-dihydroxystyryl)-3-methyl-2-thiazolinium iodide. |
| Do | 2-(3,4-dihydroxystyryl)-3-ethyl benzothiazolium iodide. |
| Do | 2-(3,4-dihydroxystyryl)-1-ethylnaphtho[1,2-d]-thiazolium iodide. |
| Do | 2-p-dimethylaminostyryl-3-(2,3,4-trihydroxyphenacyl)benzothiazolium iodide. |
| Benzylidene derivative. | α-(3,4-dihydroxybenzoyl-α-(p-dimethyl-aminobenzylidene)acetonitrile. |
| Do | α-(p-diethylaminobenzylidene-α-(3,4-dihydroxybenzoyl)acetonitrile. |
| Do | α-(p-diethylaminobenzylidene)-α-(2,3,4-trihydroxybenzoyl)acetonitrile. |
| Do | 5-(3,4-dihydroxybenzylidene)-1-ethoxycarbonylmethyl-3-phenyl-2-thiohydantoin. |
| Do | 5-(3,4-dihydroxybenzylidene)-3-ethylrhodanine. |
| Anthroquinone dye | 1,2-dihydroxyanthraquinone. |
| Do | 1,2-dihydroxyanthraquinone-3-sulfonic acid sodium salt. |
| Do | 1,2,4-trihydroxyanthraquinone. |
| Do | 1,2-dihydroxy-5-(2-sodiumsulfophenyl)-amido-8-(2-sodiumsulfo-4-methylphenyl)-amido-anthraquinone. |
| Phthalein dye | Pyrogallosulfonephthalein. |
| Oxonol dye | Bis(3,4-dihydroxybenzoyl)acetonitrile trimethine oxonol. |
| Pyrylium dye | 2,5-diphenyl-4-(2,3,4-trihydroxyphenyl)-pyrylium perchlorate. |
| Do | 2,6-diphenyl-4-(3,4-dihydroxyphenyl)-pyrylium perchlorate. |
| Do | 2-(3,4-dihydroxyphenyl)-4-(4-methoxyphenyl)-6-phenyl pyrylium perchlorate. |
| Do | 2-(3,4-dihydroxyphenyl)-4-phenyl-6-(3,4-diethoxy-β-ethylstyryl)pyrylium fluoborate. |
| Do | 2-(3,4-dihydroxyphenyl)-4-phenyl-6-(4-methoxy-β-ethylstyryl)pyrylium fluoborate. |
| Furan derivative | 1,2,3,4-tetrahydro-4-oxo-6,7-dihydroxy-2,2-dimethyldibenzo furan. |
| Polyhydroxylic gallate ester. | Tannic acid. |
| Catechol | 4-(3,5,7-trihydroxy-1,4-naphthoquinon-2-yl) pyrocatechol. |

TABLE I—Continued

| Compound class | Compound name |
| --- | --- |
| Catechol | 1,2-pyrocatechol-4,5-disulfonic acid sodium salt. |
| Do | Pyrocatecholsulfonephthalein. |
| Do | 4-(phenyliminomethyl)pyrocatechol. |
| Do | 4-(p-acetamidophenylazo)pyrocatechol. |
| Do | 4-(2,4-dinitrophenylhydrazonomethyl)pyrocatechol. |

Other vicinal polyols which form colored complexes with titanium dioxide are also advantageous in the present invention and include such compounds as pyrylium and thiapyrylium salts like those described in U.S. Pat. 3,250,615, but with the subject 12-dihydroxy substitution added thereto, as well as anacid-1,5-di-(3,4-dihydroxy)-benzoylpenta - 1,3-dienylenebis-pyridinium chloride, isoascorbic acid and 2 - (3,4-dihydroxybenzoyl)-3-2,3,6,7-tetrahydro-1H,5H-benzo[i,j]quinolizin-9-yl)acetonitrile.

In addition to the above noted polyols, 8-hydroxyquinolines function desirably as ligands in the practice of this invention, although the above-described vicinal polyols are preferred. Since it is the hetero nitrogen atom of the quinoline nucleus, combined with the 8-hydroxy substituent, which promotes bidentate complexing with titanium dioxide, all 8-hydroxyquinolines which are colored or become colored when they are so complexed are advantageous ligands in the subject invention. The substitution of various auxochromes will change the maximum absorption spectra, but not deleteriously affect the advantageous spectral sensitometric effect. Illustrative of typical 8-hydroxyquinolines are the examples provided in the examples provided in the following table.

TABLE II 8-hydroxyquinoline
4-(8-hydroxyquinolylazo)-1-naphthalene sulfonic acid
4-(8-hydroxy-5-quinolylazo)acetanalide HCl
7-[(p-nitroanilino)phenylmethyl]-8-hydroxyquinoline
7-[(o-methoxycarbonylanilino)phenylmethyl]-8-hydroxyquinoline
5-hydroxymethyl-8-hydroxyquinoline
5-benzoyl-8-hydroxyquinoline
5,7-dichloro-8-hydroxyquinoline
5,7-diiodo-8-hydroxyquinoline
5-carboxyl-8-hydroxyquinoline
5-sulfo-7-iodo-8-hydroxyquinoline
5-sulfo-8-hydroxyquinoline
5,7-dibromo-8-hydroxyquinoline
5-aceto-8-hydroxyquinoline
7-[(o-ethoxycarbonylanilino)phenylmethyl]-8-hydroxyquinoline
7-[(o-carboxylanilino)phenylmethyl]-8-hydroxyquinoline
7-[(p-carboxylanilino)phenylmethyl]-8-hydroxyquinoline.

Other ligands exhibiting advantageous configurations, wherein the formation of colored bidentate titanium dioxide complexes is promoted, are such compounds as those having an aromatic nucleus on which a hydroxyl radical is substituted ortho to a basic nitrogen atom, for example azo dyes like 2-(2-methoxy-4-nitrophenylazo)-8-hydroxynaphthol-3,6-disulfonic acid sodium salt.

Complex-promoting ligands such as the types mentioned herein, form visible-light-sensitive, colored complexes with both microcrystalline, vacuum-deposited titanium dioxide and particulate titanium dioxide such as colloidal titanium dioxide having, for example rutile or anatase crystalline structure. When the titanium dioxide and a ligand compound having a polydentate chelating moiety as described herein are complexed, generally by conventional means such as admixing with stirring or dipping, the two reagents are typically present with an excess of ligand compound since it is desirable to ensure that all of the surface titanium dioxide which is amenable to complexing is so reacted. The presence of excess ligand compound does not detrimentally affect spectral sensitization, and amounts up to complete monolayer coverage can be advantageously complexed with surface titanium dioxide without experiencing desensitization.

The production of a composite, light-sensitive photographic element is accomplished either by coating the visible-light-sensitive, colored titanium dioxide complex on a support material or, subsequent to coating, by treating the titanium dioxide with a ligand compound to form the desired colored complex in situ on the support. Support materials upon which to coat the photosensitive titanium dioxide are subject to wide variation and are limited only by the use to which the completed photograph will be applied. Additionally, where vacuum deposited titanium dioxide is utilized, the support material must necessarily be resistant to degradation by those temperatures incurred during the actual vacuum deposition. Glass is suitably employed as are metals such as aluminum, copper, zinc and tin. Conventional photographic film bases, such as cellulose acetate, cellulose nitrate, cellulose acetate butylrate, poly(ethylene terephthaate), poystyrene and paper including polyethylene-coated paper and polypropylene-coated paper are all susceptible of advantageous use.

Where vacuum-deposited titanium dioxide is used, the coating operation is accomplished by well-known vacuum deposited techniques, such as those described for vacuum depositing silver halide as in U.S. Pat. No. 1,970,496. Typically, the support material is placed within a sealable enclosure along with metallic titanium which can be used as the source of titanium dioxide by introducing oxygen into the vacuum system. Alternatively, titanium dioxide can be used in lieu of titanium metal. The enclosure is sealed, the pressure reduced and the temperature elevated, which combination of conditions produces the sublimation of titanium dioxide microcrystals upon such support material.

Coating thickness can be typically varied between about .02 micron and about .5 micron, with thicknesses of between about .05 micron and about .4 micron preferred. At substantially less than .02 micron, there is insufficient titanium dioxide present to afford adequate photographic sensitivity, and when coatings are prepared at thicknesses significantly in excess of agout .6 micron, photographic response declines.

Subsequent to vacuum-deposition, the titanium dioxide is rendered visible-light-sensitive by forming the subject colored complexes. Complexing is typically obtained by contacting the layer of vacuum-deposited titanium dioxide with an organic solvent or aqueous solution of one or more of the subject ligands. Alternatively, mixtures of solvents can be used. The method of contacting can be immersion, spraying, dipping, swabbing or any other means whereby the ligand compound contacts the titanium dioxide for a period of time sufficient to promote the colored complexes of the present invention. After a suitable treatment, excess solution is permitted to drain off the coated support and the coating is dried to produce a composite, vacuum-deposited titanium dioxide photographic element which is spectrally sensitized to visible light.

When particulate titanium dioxide coated from solution in the presence of a binder material is used as the photosensitive component, the subject complex forming ligands are typically included in the coating solution in such amounts as are described hereinabove, and the ultimate complex is then coated on the support. If it is preferred, however, complexing can be accomplished subsequent to coating the titanium dioxide according to the methods outlined for vacuum deposited titanium dioxide.

The choice of binder material is largely dependent upon the use to which the completed photographic element will be applied. Where the ultimate photographic image is a silver or other metallic image produced by conventional photographic techniques such as the physical development described herein, hydrophilic binders such as gelatin, polyvinyl alcohol and other water permeable polymers are particularly compatible with processing media which are typically aqueous solutions.

In addition to exhibiting utility in the production of a conventional photographic silver or other metal image, the subject photographic elements in which particulate titanium dioxide is coated from a binder material, can be advantageously employed as electrophotographic elements when an insulating binder material is utilized. Typical insulating binders include such hydrophobic polymeric materials as styrene and copolymers of styrene.

Preferred binders for use in preparing the present photoconductive layers comprise polymers having fairly high dielectric strength which are good electrically insulating film-forming vehicles. Materials of this type comprise styrene-butadiene copolymers; silicone resins; styrene-alkyd resins; silicone-alkyd resins; soya-alkyd resins; poly(vinyl chloride); poly(vinylidene chloride); vinylidene chloride-acrylonitrile copolymers; poly(vinyl acetate); vinyl acetate-vinyl chloride copolymers; poly(vinyl acetals), such as poly(vinyl butyral); polyacrylic and methacrylic esters, such as poly(methylmethacrylate), poly(n-butylmethacrylate), poly(isobutyl methacrylate), etc.; polystyrene; nitrated polystyrene; polymethylstyrene; isobutylene polymers; polyesters, such as poly(ethylene-alkaryloxyalkylene terephthalate); phenol-formaldehyde resins; ketone resins; polyamide; polycarbonates; polythiocarbonates; poly(ethyleneglycolco-bishydroxyethoxyphenyl propane terephthalate); etc. Methods of making resins of this type have been described in the prior art, for example, styrene-alkyd resins can be prepared according to the method described in U.S. Pats. 2,361,019 and 2,258,423. Suitable resins of the type contemplated for use in the photoconductive layers of the invention are sold under such trade names as Vitel PE-101, Cymac, Piccopale 100, Saran F-220 and Lexan 105. Other types of binders which can be used in the photoconductive layers of the invention include such materials as paraffin, mineral waxes, etc.

The amount of binder material which is coated with the titanium dioxide can be widely varied in accordance with conventional practice. Typically, where hydrophilic binder materials are employed in the production of conventional photoimages, from about .05 to about 1 part by weight of polymeric binder per 1 part by weight of titanium dioxide is employed, but more extensive variations can be used if desired. In the production of images by electrophotographic means, higher proportions of the insulating polymeric binder material are required to preserve a latent electrostatic charge image that will promote advantageous development. Without adequate amounts of an insulating binder, the latent charge image is subject to rapid decay. Conventionally, from about 1 to about 5 parts by weight of binder material per part by weight of titanium dioxide are employed, but larger or smaller amounts can be used.

A photographic element coated and produced as described hereinabove can be stored under lighted conditions. If it is so stored, then immediately prior to exposure it must be dark adapted. Dark adaptation constitutes storing the titanium dioxide coated support under dark conditions for a time sufficient to raise the resistivity of the titanium dioxide to a point where the ratio of dark resistivity to light resistivity is sufficiently great to permit the development of a suitable dense photographic image. The length of this period of dark conditioning depends in part upon the intensity with which the element has been previously exposed and the intensity with which it will receive its intended imagewise exposure. Typically, however, dark adapatation of from about 10 to about 24 hours will insure adequate photographic response. Alternatively, storing the photographic element under conditions of elevated temperature may enhance photosensitivity.

The photographic elements of the present invention which are particularly designed for the production of images by electrophotographic means typically have this period of dark adaptation supplemented or replaced by a short period of electrical charging in an electrostatic field produced by a corona wire or other suitable source of electrons. Such electrical charging is also accomplished under substantially darkened conditions to permit the establishment of an adequate differential charge distribution upon a suitable imagewise exposure.

The subject photographic elements which are described herein as being suited for the production of conventional photographic images by physical development means are typically exposed through an original pattern or to another imagewise pattern of light, producing a latent charge image corresponding to the exposed and unexposed areas. The presence of such a charge distribution renders the photographic element amenable to development. The titanium dioxide layers on the present photographic elements are sensitive to visible light radiation due to formation of the described colored complexes between titanium dioxide and the ligand compounds of this invention, and hence, exposing means which are rich in the particular absorption wavelengths of each complex are preferred. However, due to the natural sensitivity of titanium dioxide to ultraviolet rays, such an exposing means can also be employed.

Development of a latent image in such of the present photographic elements as are designed to produce a photographic silver or other metal image, is preferably a two-step physical development sequence. Initially, the imagewise exposed element is treated with a solution typically containing silver ions. Such a solution can be, for example, an aqueous solution of a silver salt such as silver nitrate, silver perchlorate, silver p-toluene sulfonate, etc., and treatment therewith produces microscopic deposits or development centers of metallic silver in the exposed areas. The treating techniques can be by immersion, swabbing, spraying or any other means whereby sufficient solution contacts the exposed element.

Subsequent to the treatment with a solution preferably containing silver ions, the imagewise exposed photographic element is treated with a physical developer solution containing heavy metal ions in salt form and a reducing agent for the metal ions, and when the metal ion salt is substantially insoluble in water, a solvent for the metal ion salt, such as water-soluble thiosulfates, thiocyanates, etc. to produce a visible photographic image corresponding to the exposed areas having development centers. Typical physical developer solutions are well known (see Hornsky, Basic Photographic Chemistry (1956), 66, and Mees and James, ed., The Theory of the Photographic Process, 3rd ed. (1966), 329–331) and contain the metallic ions such as silver, copper, iron nickel and cobalt necessary to form a visible image at and in the vicinity of nucleating centers; the microscopic metal deposits created during the above described first step. Typical reducing agents used in the physical developer include, for example, polyhydroxy-substituted aryl compounds such as hydroquinones, catechols and pyrogallols; ascorbic acid derivatives; aminophenols; p-phenylenediamines, and the like developing agents used in the photographic art. Particular examples of reducing agents for physical developer solutions are 2-methyl-3-chlorohydroquinone, bromohydroquinone, catechol, 5-phenylcatechol, pyrogallol monomethyl ether (1-methoxy-2,3-dihydroxybenzene) and 5-methylpyrogallol monomethyl ether, isoascorbic acid, N-methyl-p-aminophenol, dimethyl-p-phenylene diamine, 4-amino-6,6-di(n-propyl) aniline and 6-amino-1-ethyl-1,2,3,4-tetrahydroquinoline. The completely developed element carries a visible image, typically metallic silver, corresponding to the exposed areas. As such, it is a negative reproduction of the original pattern, and when a negative serves as the original pattern, positive copies are obtained.

Where electrophotographic development is involved with certain of the subject photographic elements, and after the above described electrostatic corona or other charging operation and an imagewise exposure to activating light radiation which is within the absorption spectra of whatever subject colored complex is the photosensitive component, the photographic element bearing an electrostatic latent charge image is contacted with a conventional electrophotographic developer composition which typically includes a colorant material such as carbon black, a binder material such as a polymeric, thermoplastic resin and a carrier material such as iron filings or glass beads. Mutual rubbing of colorant and binder (which are typically a composite solid dispersion) against the carrier operates to produce an electrostatic charge on the colorant-binder combination. Upon such contact, an unexposed imagewise pattern of the charged colorant-binder composition adheres to the oppositely charged areas of the photographic element. Subsequent heating of the element causes melting of the thermoplastic binder and permanently fixes the image. In addition to the conventional electrophotographic developer described herein, other advantageous developer compositions include liquid developers such as dyed resin and pigment types, as well as other dry developers employing a wide variety of pigments, dyes and resins.

The photographic images produced according to the practice of the present invention, employing the subject photographic elements bearing colored, visible-light-sensitive complexes such as are described herein, exhibit a developed image density which indicates that the efficiency of sensitization of such elements to visible light is equivalent to the photosensitivity of titanium dioxide to ultraviolet light. For ease of comparison, the sensitometric speed of titanium dioxide to ultraviolet radiation is expressed herein as one and that of the subject photographic elements to visible light at their maximum absorption spectra is designated as relative sensitometric speed in decimal portions of the set value of one for titanium dioxide. In such fashion, the efficiency of spectral sensitization induced by the formation of the subject complexes can be readily compared with that of titanium dioxide as a control.

The invention has been described above in considerable detail, but the utility of the subject photographic elements and processes will become increasingly obvious from the following examples, which are included for a further understanding of the invention.

EXAMPLE 1

To 269 ml. of water and 11 ml. of a 10% ethylenediamine tetraacetic acid is added, with stirring, 280 g. of a particulate titanium dioxide marketed under the designation Unitane-0520 by American Cyanamid Company. To this mixture is then added a first solution containing 320 ml. of 7.5% polyvinyl alcohol and 11 ml. of a 10% aqueous solution of a condensed sulfonic acid sodium salt marketed as Tamol N by Rohm and Haas Company, and a second solution containing 2 ml. of 7.5% saponin and 10 ml. of .1% aqueous tannic acid solution. After the addition of the tannic acid, the solution becomes deeper yellow in color. This composite mixture constitutes a coating solution wherein the tannic acid is present as the complexing ligand bearing ortho hydroxyl substituents as chelating moieties. The coating solution is then coated at a .004 in. wet thickness on polyethylene-coated paper and dried, thereby producing a completed photographic element. A portion of the element so prepared is then exposed in a wedge spectrograph for 15 seconds at a slit width of 5 mm., and processed by sequentially immersing the exposed element first in a 1% aqueous silver nitrate solution for 5 seconds, then in distilled water for 5 seconds and then for one minute in a physical developer composition having the formula.

Part A:
Water _____ cc __ 800
Sodium sulfite _____ g __ 20
Sodium isoascorbate _____ g __ 26
Sodium carbonate (monohydrate) _____ g __ 50
Octylphenoxyethoxy ethyldimethyl - p - chlorobenzyl ammonium chloride (1% in $H_2O$) _____ cc __ 22
Water to 1 liter.
pH—11.0.

Part B:
Water _____ cc __ 800
Sodium thiosulfate·$5H_2O$ _____ g __ 30
Silver chloride _____ moles __ $5 \times 10^{-2}$
Water to 960 cc.
5-methylbenzatriazole (1% in dil. KOH) _____ cc __ 40 wherein parts A and B are mixed just prior to use. For making the silver chloride used in part B, 42.4 g. of silver nitrate are dissolved in 900 cc. of water, and 42.4 g. of potassium chloride is dissolved in a second 900 cc. of water. Then, 90 cc. of each solution are mixed in 6 ounce bottles which are allowed to stand overnight, after which time the liquid is poured off. The contents of two such bottles is required to make the $5 \times 10^{-2}$ moles, since each contains $2.5 \times 10^{-2}$ moles of silver chloride. After development, a dense silver image is present in the exposed areas. A second element is prepared in like fashion, except that the tannic acid is omitted from the coating. The spectral sensitivity of the element containing tannic acid ranges from 320 m$\mu$ to 620 m$\mu$, with a broad absorption peak at 440 to 480 m$\mu$, whereas that of the uncomplexed titanium dioxide ranges only from 320 to 390 m$\mu$, with a peak at 360 m$\mu$.

EXAMPLE 2

A titanium dioxide dispersion is prepared as follows:

(1) 150 g. of particulate titanium dioxide are added to 860 ml. of a 8.73% aqueous solution of the sodium salt of a copolymer of acrylic acid and ethyl acrylate (20:80), and (2) after stirring the above mixture 3,150 ml. of water are added with continued stirring.

A coating composition is then prepared by adding .3 ml. of .3% tannic acid to 27 ml. of the noted dispersion, whereupon the coating composition becomes more intensely colored due to the complexing reaction between the tannic acid and titanium dioxide. This coating composition is then coated at a .002 inch wet thickness on polyethylene-coated paper and dried to prepare a composite, light-sensitive photographic element. The element so produced is exposed to a wedge spectrograph as described in Example 1 and processed by first immersing the element in a 1% ethanolic silver nitrate solution for 5 seconds and then directly transferring it into a 5% methanolic hydroquinone solution for a period of five seconds. After these two immersions, the element is allowed to dry for about one minute to permit an image to appear. Fixation of the image is then obtained by immersing the element for ten seconds in a fixing bath having the formula:

Water (at 52° C.) _____ ml __ 500
Sodium thiosulfate _____ g __ 240
Sodium sulfite (desiccated) _____ g __ 10
Sodium bisulfite _____ g __ 25
Water to make 1 liter.

after which it is washed in distilled water for 30 seconds and dried. Spectral response ranges from 320 to about 640 m$\mu$, with a broad peak at 440 to 480 m$\mu$.

EXAMPLE 3

A photographic element is made according to the procedure described in Example 2, except that instead of adding a tannic acid solution to 27 ml. of the titanium dioxide dispersion, 1 cc. of an aqueous solution containing 1 g./l. of 4-(3,5,7-trihydroxy-1,4-naphthoquinon-2-yl) pyrocatechol is substituted for the tannic acid as the ligand compound. When this element is exposed and processed in the manner described in Example 2, spectral response extends from 320 to 640 m$\mu$ with a relative sensitometric speed of 1 at its peak absorption spectra of from 440 to 470 m$\mu$.

EXAMPLE 4

A titanium dioxide dispersion is prepared by adding 15 g. of particulate titanium dioxide and 85 ml. of the aqueous ethylacrylate-acrylic acid copolymer solution described in Example 2 to 150 ml. of distilled water. To 20 ml. of this dispersion is added 1.3 cc. of an aqueous solution containing 1 g./liter of pyrocatechol-4,5-disulfonic acid sodium salt, forming a coating composition. Coating, exposure and processing are accomplished as described in Example 2, after which the element's spectral response is observed from 320 to 560 m$\mu$, with a broad peak absorption at about 430 m$\mu$.

EXAMPLE 5

A titanium dioxide disperson and coating composition are prepared according to the procedure of Example 4, except that a methanol solution containing 1 g./liter of the dihydroxy cyanine dye, 3,3'-di(3,4-dihydroxy)phenacylthiacarbocyanine chloride, is the ligand compound. After coating, exposure and processing as in Example 2, spectral response for the element is observed from 320 to 580 m$\mu$. With the sensitometric speed of titanium dioxide being regarded as 1 at 360 m$\mu$, the relative sensitometric speed for the colored dihydroxy cyanine dye-titanium dioxide complex is also 1 at its broad peak absorption band around 460 m$\mu$.

EXAMPLE 6

A coating composition is prepared sequentially as follows:

(1) to 132 ml. of distilled water is added 15 g. of particulate titanium dioxide,
(2) to the above dispersion is added 7.5 ml. of a solution containing 1 g./liter of the dye, 9-(3,4-dihydroxyphenyl)-3,3'-dimethylthiacarbocyanine iodide, after which is then added,
(3) 75 ml. of a 10% gelatin solution,
(4) 2.5 ml. of a 7.5% aqueous saponin solution, and
(5) .4 ml. of a 10% aqueous formaldehyde solution.

The complete coating composition is coated on polyethylene-coated paper at an overall coverage of 5 g./ft.² Exposure and processing of the photographic element so prepared are accomplished as described in Example 1, except that the duration of exposure is 1 second in lieu of 15 seconds. The processed element exhibits spectral response from 320 to 680 m$\mu$, with a relative sensitometric speed of 1 at its broad peak absorption spectra at 560 to 580 m$\mu$. A second photographic element is made and processed according to the procedure of this example, except that the sensitizing compound is a cyanine dye identical in concentration and structure but without the vicinal dihydroxy chelating moieties. Spectral response is obtained in essentially the same spectral region but with the complex-promoting chelating moieties of the dihydroxy dye removed from the chromophore relative sensitometric speed falls off to .001 at the cited peak absorption spectra.

EXAMPLE 7

A coating composition is prepared as follows:

(1) to 25 ml. of distilled water is about 5 g. of titanium dioxide with vigorous stirring, after which is added
(2) 1.0 ml. of a dimethylformamide solution containing 10 g./liter of a ligand dye 1,2-dihydroxyanthraquinone (alizarin),
(3) 15 ml. of a 10% gelatin solution (after 2 minutes stirring of parts 1 and 2),
(4) 2 ml. of a 7.5% saponin solution, and
(5) 1 ml. of a 10% formaldehyde solution.

To prepare a photographic element, the coating composition is coated at a .004 inch wet thickness on polyethylene-coated paper and dried. Exposure and processing are accomplished according to the procedure outlined in Example 6. The developed element exhibits spectral sensitivity in the range of from 320 to 660 m$\mu$ with a relative sensitometric speed of 1 at its peak absorption spectra band of 510 to 560 m$\mu$.

EXAMPLE 8

A photographic element is prepared as in Example 7, except that the sensitizing ligand compound is another anthraquinone dye, 1,2-dihydroxyanthraquinone-3-sulfonic acid sodium salt (alizarin red). The wedge spectrogram obtained after exposure and processing of the element shows spectral sensitivity from 320 to 580 m$\mu$, with a relative sensitometric speed of 1 at the element's peak absorption bond of 550 m$\mu$.

EXAMPLE 9

Four photographic elements are prepared, exposed and processed according to the procedure described in Example 3, except that the ligand compounds are 8-hydroxyquinolines. The results obtained are summarized in tabular form.

| Compound | Mg./g. TiO$_2$ | M$\mu$ sens. range | M$\mu$ sens. max. |
|---|---|---|---|
| Control | 0 | 320–380 | |
| 8-hydroxyquinoline | 100 | 320–520 | 420–430 |
| 4-(8-hydroxy-5-quinolylazo)-1-naphthalenesulfonic acid | 1 | 320–360 | 510–520 |
| 4-(8-hydroxy-5-quinolylazo)-acetanilide·HCl | 1 | 320–560 | |

EXAMPLE 10

Photographic elements are prepared, exposed and processed as described in Example 7, obtaining similar results, except that alternate sensitizing ligand compounds are substituted for the cyanine dye of Example 7. The vicinal dihydroxy ligands used herein are summarized below in tabular form:

4-(3,4-dihydroxyphenyl)-3,3'-diethyloxathiazolocarbocyanine perchlorate
3,3'-diethyl-11-(3,4-dihydroxyphenyl)-oxathiadicarbocyanine iodide
3,3'-distyryl-9-(3,4-dihydroxybenzyl)-thiadicarbocyanine iodide
1-(3,4-dihydroxybenzoyl)-5-(3-ethyl-5-phenyl-2-benzoxazolinylidene)-1,3-pentadienylpyridinium iodide
1-(3,4-dihydroxybenzoyl)-5-(3-ethyl-2-benzothiazolinylidene)-1,3-pentadienyl pyridinium iodide
2-(3-methyl-2-benzothiazolinylidene)-1-(3,4-dihydroxyphenyl)ethylidene malonitrile
4-(3-ethyl-2-benzothiazolinylidene)-1-(3,4-dihydroxyphenyl)-2-butenylidene-malonitrile
2-(3-ethyl-2(3)-benzoxazolylidene)-ethylidene-6,7-dihydroxy-3(2)-benzofuranone
2-[5-cyano-5-(3,4-dihydroxybenzoyl)-2,4-pentadienylidene]-3-ethyl-5-phenyl-benzoxazoline
5-chloro-2-[5-cyano-5-(3,4-dihydroxybenzoyl)-2,4-pentadienylidene]-3-(3-sulfopropyl)benzoxazoline
2-(3,4-dihydroxystyryl)-3-methyl-2-thiazolinium iodide
2-(3,4-dihydroxystyryl)-3-ethyl-benzothiazolium iodide
2-(3,4-dihydroxystyryl)-1-ethylnaphtho[1,2-d]thiazolinum iodide
2-p-dimethylaminostyryl-3-(2,3,4-trihydroxyphenacyl)benzothiazolium iodide
$\alpha$-(3,4-dihydroxybenzoyl)-$\alpha$-(p-dimethylaminobenzylidene)-acetonitrile α-(p-diethylaminobenzylidene-α-(3,4-dihydroxybenzoyl)-acetonitrile
α-(p-diethylaminobenzylidene)-α-(2,3,4-trihydroxybenzoyl)-acetonitrile
5-(3,4-dihydroxybenzylidene)-3-ethyl-rhodanine
1,2,4-trihydroxyanthraquinone
1,2-dihydroxy-5-(2-sodiumsulfophenyl)amido-8-(2-sodiumsulfo-4-methylphenyl)amido-anthraquinone
pyrogallosulfonephthalein
bis(3,4-dihydroxybenzoylacetonitrile trimethine oxonol
2,6-diphenyl-4-(2,3,4-trihydroxyphenyl)pyrylium perchlorate
2,6-diphenyl-4-(3,4-dihydroxyphenyl)pyrylium perchlorate
1,2,3,4-tetrahydro-4-oxo-6,7-dihydroxy-2,2-dimethyl-dibenzo furan
4-(3,5,7-trihydroxy-1,4-naphthoquinon-2-yl)pyrocatechol
1,2-pyrocatechol-4,5-disulfonic acid sodium salt
pyrocatecholsulfonephthalein.

EXAMPLE 11

A piece of glass support is coated with a 100 mμ thick layer of microcrystalline titanium dioxide produced by the vacuum deposition of titanim metal at $10^{-4}$ torr. The titanium dioxide is rendered suitably photoactive by dark adaptation for 18 hours. The photographic element so produced is then treated with an alcohol-water solution containing 1 g./liter of 9-(3,4-dihydroxyphenyl)-3,3'-dimethylthiacarbocyanine iodide and dried. Exposure is accomplished in a wedge spectrograph for 1 minute and at a slit width of 10 mm. The exposed element is then processed by a first immersion in .1 N silver nitrate, a second immersion in a distilled water wash and a third immersion in a physical developer like that described in Example 1. Spectral response in the developed element ranges from 320 mμ to 640 mμ with a relative sensitometric speed of 1 at the peak absorption spectra of 520 mμ to 540 mμ.

EXAMPLE 12

To each of seven 10 ml. portions (B–H) of a titanium dioxide dispersion is added 2.0 ml. of a 0.1% methanolic solution of sensitizer compounds as are tabulated below. These sensitizers are of the general types described in Belgian Pat. 679,558 and British Pat. 1,114,301. An eighth portion (A) functions as a control and no sensitizer is added. After coating the eight portions to prepare corresponding light-sensitive photographic elements, and thereafter exposing and processing these elements, all as in Example 2, photographic images are prepared. Sensitometric results are also tabulated below.

TABLE 1

| Melt/element | Sensitizer | Spectral response, nm. | Density steps |
|---|---|---|---|
| A | None | 320–390 | 6 |
| B | 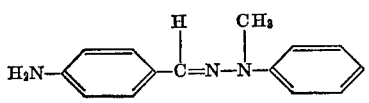 | 320–390 | 6 |
| C | 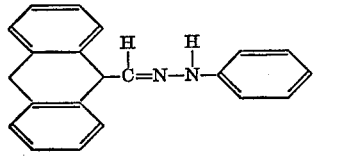 | 320–390 | 6 |
| D | 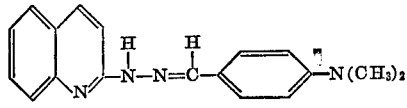 | 320–390 | 6 |
| E | 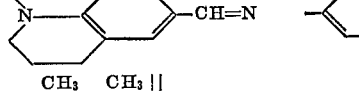 | 320–390 | 6 |
| F | 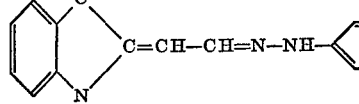 | 320–390 | 6 |
| G | 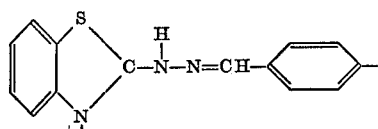 | 320–390 | 6 |
| H | 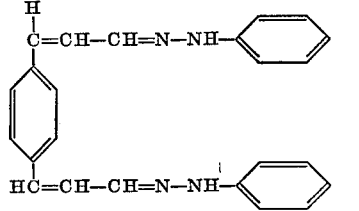 | 320–390 | 6 |

With reference to the above table, it is noted that each of these sensitizers fails to sensitize TiO₂ to the visible region. This is contradistinguished from the vicinal polyol, etc. sensitizers of the present invention which sensitize TiO₂ efficiently, to those portions of the visible spectrum absorbed by the colored chelate complexes described herein.

EXAMPLE 13

A coating composition is prepared by first adding 2 ml. of a 1% dimethylformamide solution of the dye, 4-(3-ethyl-2-benzothiazolinylidene-1 - (3,4 - dihydroxyphenyl)-2-butenylidene malonitrile, to .5 g. of particulate colloidal titanium dioxide. Then, 10 ml. of a 10% toluene solution of a styrene copolymer marketed under the name Pliolite S–7 by the Goodyear Tire and Rubber Company is added as an electrically insulating binder material to form a complete coating composition which is ball milled for four hours and coated on a conducting paper support at a wet thickness of .01 inch, thereby producing a visible light-sensitive titanium dioxide electrophotographic element. The composite element is charged by passing beneath a corona discharge wire and exposed on a modified spectrograph for 5 seconds at a 10 mm. slit width. After exposure, the element is toned with an opposite polarity dry powder toner to produce a wedge spectrograph which shows the element to have a spectral sensitivity from 400 mμ to 590 mμ with a broad peak response from 490 mμ to 580 mμ.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A photographic element comprising a support having coated thereon a light-sensitive layer comprising a colored chelate complex of titanium dioxide and an unsaturated organic ligand compound having a polydentate chelating group comprising electron-donating atoms which are separated from each other on said organic ligand compound by 23 intervening atoms, said unsaturated organic ligand compound being one of either an organic vicinal polyol or an 8-hydroxyquinoline.

2. A photographic element as described in claim 1 wherein the unsaturated organic ligand compound is an organic vicinal polyol, said organic vicinal polyol being a compound having vicinal free hydroxyl radicals substituted on at least two adjacent nuclear atoms of an aromatic ring structure, and being selected from the group consisting of dihydroxy substituted:

(a) cyanine dyes,
(b) merocyanine dyes,
(c) anthraquinone dyes,
(d) benzylidene dyes,
(e) styryl dyes,
(f) dyes redived from furan,
(g) phthalein dyes,
(h) oxonol dyes,
(i) pyrylium dyes,
(j) thiapyrylium dyes,
(k) catechols, and
(l) polyhydroxylic gallate esters.

3. A photograph element as described in claim 1 wherein the unsaturated organic ligand compound is an 8-hydroxyquinoline, said 8 - hydroxyquinoline being selected from the group consisting of:

(a) 8-hydroxyquinoline,
(b) 4-(8-hydroxy-5-quinolylazo)-1-naphthalene sulfonic acid,
(c) 4-(8-hydroxy-5-quinolylazo)acetanilide HCl,
(d) 7-[(p-nitroanilino)phenylmethyl]-8-hydroxyquinoline,
(e) 7-[(o-methoxycarbonyl anilino)phenylmethyl]-8-hydroxyquinoline.
(f) 5-hydroxymethyl-8-hydroxyquinoline,
(g) 5-benzoyl-8-hydroxyquinoline,
(h) 5,7-dichloro-8-hydroxyquinoline,
(i) 5,7-diiodo-8-hydroxyquinoline,
(j) 5-carboxyl-8-hydroxyquinoline,
(k) 5-sulfo-7-iodo-8-hydroxyquinoline,
(l) 5-sulfo-8-hydroxyquinoline,
(m) 5,7-dibromo-8-hydroxyquinoline,
(n) 5-aceto-8-hydroxyquinoline,
(o) 7-[(o-ethoxycarbonylanilino)phenylmethyl]-8-hydroxyquinoline,
(p) 7-[(o-carboxyanilino)phenylmethyl]-8-hydroxyquinoline, and
(q) 7-[(p-carboxyanilino)phenylmethyl]-8-hydroxyquinoline.

4. A photographic element as described in claim 1 wherein the unsaturated organic ligand compound is an organic vicinal polyol, said organic vicinal polyol being selected from the group consisting of:

(a) isoascorbic acid,
(b) 3,3'-di(3,4-dihydroxy)phenacylthiacarbocyanine chloride,
(c) 3,3'-diethyl-11-(3,4-dihydroxyphenyl)oxathiadicarbocyanine iodide,
(d) 3,3'-diethyl-9-(3,4-dihydroxyphenyl)thiadicarbocyanine iodide,
(e) 2-(3-ethyl-2(3)-benzoxazolylidene)ethylidene-6,7-dihydroxy-3(2)benzofuranone,
(f) 2-[5-cyano-5-(3,4-dihydroxybenzoyl)-2,4-pentadienylidene]-3-ethyl-5-phenylbenzoxazoline,
(g) 1,2-dihydroxyanthraquinone,
(h) 1,2-dihydroxyanthraquinone-3-sulfonic acid sodium salt,
(i) 5-(3,4-dihydroxybenzylidene)-1-ethoxycarbonylmethyl-3-phenyl-2-thiohydantoin,
(j) α-(3,4-dihydroxybenzoyl)-α-(p-dimethylaminobenzylidene)acetonitrile,
(k) 5-(3,4-dihydroxybenzylidene)-3-ethylrhodanine,
(l) 2-(3,4-dihydroxystyryl)-3-methyl-2-thiazolinium iodide,
(m) 2-p-dimethylaminostyryl-3-(2,3,4-trihydroxyphenacyl)benzothiazolium iodide,
(n) 1,2,3,4-tetrahydro-4-oxo-6,7-dihydroxy-2,2-dimethyldibenzofuran,
(o) pyrogallosulfonephthalein,
(p) bis(3,4-dihydroxybenzoyl)acetonitrile trimethine oxonol,
(q) benzoyl (p-dimethylaminocinnamylidene)acetonitrile,
(r) 2,6-diphenyl-4-(2,3,4-trihydroxyphenyl)pyrylium perchlorate,
(s) 2,6-diphenyl-4-(3,4-dihydroxyphenyl)thiapyrylium perchlorate,
(t) 4-(phenyliminomethyl)pyrocatechol,
(u) 4-(2,4-dinitrophenylhydrazonomethyl)pyrocatechol,
(v) 4-(p-acetamidophenylazo)pyrocatechol,
(w) 1,2-catechol-4,5-disulfonic acid sodium salt, and
(x) tannic acid.

5. A photographic element as described in claim 1 wherein the titanium dioxide of said colored complex comprises binderless titanium dioxide said titanium dioxide being vacuum deposited prior to complexing.

6. A photographic element as described in claim 5 wherein said light-sensitive layer has a thickness of from about .02 micron to about .5 micron.

7. A photographic element as described in claim 1 wherein the titanium dioxide of said colored complex comprises particulate titanium dioxide dispersed in a hydrophilic binder material.

8. A photographic element as described in claim 7 wherein said binder material is a hydrophilic compound selected from the group consisting of gelatin, polyvinyl alcohol, and copolymers of acrylic acid and ethyl acrylate.

9. A photographic element as described in claim 1 wherein the titanium dioxide of said colored complex comprises particulate titanium dioxide dispersed in an electrically insulating binder material.

10. A photographic element as described in claim 9 wherein said binder material comprises a polystyrene.

References Cited

UNITED STATES PATENTS

| | | | |
|---|---|---|---|
| 3,622,341 | 11/1971 | Lee | 96—1.6 |
| 3,409,429 | 11/1968 | Ekman | 96—88 |
| 3,317,321 | 5/1967 | Chopoorian | 96—88 |
| 3,295,972 | 1/1967 | Land | 96—3 |

FOREIGN PATENTS

| | | |
|---|---|---|
| 1,437,765 | 4/1965 | France. |
| 1,114,301 | 4/1966 | Great Britain. |

J. TRAVIS BROWN, Primary Examiner

J. L. GOODROW, Assistant Examiner

U.S. Cl. X.R.

96—88

PO-1050
(5/69)

UNITED STATES PATENT OFFICE
CERTIFICATE OF CORRECTION

Patent No. 3,788,853　　　　　　　　Dated January 29, 1974

Inventor(s) Paul B. Gilman, Jr. and John A. Haefner

It is certified that error appears in the above-identified patent and that said Letters Patent are hereby corrected as shown below:

Column 1, line 24, "equipment" should read --equivalent--;

Column 15, claim 1, line 43, "23" should read --2-3--;

Column 15, claim 2, line 59, "redived" should read --derived--.

Signed and sealed this 11th day of June 1974.

(SEAL)
Attest:

EDWARD M. FLETCHER, JR.
Attesting Officer

C. MARSHALL DANN
Commissioner of Patents